(No Model.) 9 Sheets—Sheet 2.

J. J. HOGAN.
WATER TUBE BOILER.

No. 520,882. Patented June 5, 1894.

Fig. 2.

Attest:
L. Lee.
J. Van Vest Jr.

Inventor.
John J. Hogan,
per Crane & Miller, Attys.

(No Model.)

J. J. HOGAN.
WATER TUBE BOILER.

No. 520,882. Patented June 5, 1894.

Fig. 3.

Attest:
L. Lee.
J. Van Nest Jr.

Inventor.
John J. Hogan, per
Crane & Miller, attys.

(No Model.) 9 Sheets—Sheet 5.

J. J. HOGAN.
WATER TUBE BOILER.

No. 520,882. Patented June 5, 1894.

Attest:
L. Lee.
J. Van Nest Jr.

Inventor,
John J. Hogan,
per Crane & Miller, Attys.

(No Model.) 9 Sheets—Sheet 7.

J. J. HOGAN.
WATER TUBE BOILER.

No. 520,882. Patented June 5, 1894.

Attest:
L. Lee
J. Van Nest Jr.

Inventor.
John J. Hogan, per
Crane & Miller, attys.

THE NATIONAL LITHOGRAPHING COMPANY,
WASHINGTON, D. C.

(No Model.) 9 Sheets—Sheet 8.

J. J. HOGAN.
WATER TUBE BOILER.

No. 520,882. Patented June 5, 1894.

Attest:
L. Lee.
J. Van Vest Jr.

Inventor.
John J. Hogan, per
Crane & Miller, attys.

THE NATIONAL LITHOGRAPHING COMPANY,
WASHINGTON, D. C.

(No Model.) 9 Sheets—Sheet 9.

J. J. HOGAN.
WATER TUBE BOILER.

No. 520,882. Patented June 5, 1894.

Attest:
L. Lee.
Edw. P. Kinsey.

Inventor.
John J. Hogan, per
Crane & Miller, attys.

UNITED STATES PATENT OFFICE.

JOHN J. HOGAN, OF BROOKLYN, NEW YORK.

WATER-TUBE BOILER.

SPECIFICATION forming part of Letters Patent No. 520,882, dated June 5, 1894.

Application filed May 13, 1892. Serial No. 432,855. (No model.)

*To all whom it may concern:*

Be it known that I, JOHN J. HOGAN, a citizen of the United States, residing at Brooklyn, Kings county, New York, have invented certain new and useful Improvements in Water-Tube Boilers, fully described and represented in the following specification and the accompanying drawings, forming a part of the same.

The improvements described herein relate to boilers having a series of water tubes connected at the upper end with the steam drum and at the lower end with one or more distributing drums arranged adjacent to the furnace.
In the present invention, a series of ascending water tubes is extended through the furnace for the upward circulation, and a separate series of descending water tubes is shielded from the furnace heat for the downward circulation, and a special circulating pipe is also provided outside of the boiler casing and connected with the steam and distributing drums where additional circulation is desired. The ascending tubes may be connected directly with the distributing drum, which then acts as a cylindrical manifold to connect the lower ends of all the tubes; but the water tubes may be connected with the distributing drum by means of vertical headers. The ascending tubes are preferably extended through the shell of the steam drum, or have extensions attached to their outlets, to discharge the steam into the drum above the water line. A rapid upward movement is produced by the heat in the ascending water tubes over the fire, and the water discharged from such tubes into the steam drum is returned to the distributing drums outside of the furnace by the descending water tubes and circulating pipes. The descending water tubes are preferably connected with the steam drum adjacent to the water line, and their lower ends connected with the top of the manifolds or headers. Where two distributing drums are used, a mud drum is preferably arranged beneath the distributing drums transverse to the latter, and is connected to the distributing drums by cocks adapted to blow off different parts of the boiler in sections. The ascending water tubes are extended from the inner sides of the cylindrical manifolds or vertical headers in- ward over the fire, and are shown herein carried upward in a substantially vertical direction for insertion in the bottom of the steam drum. Outside the furnace containing such ascending tubes, return flues or dead flues are formed by partitions independent of such tubes, and the descending tubes are located in such return flues, which, with the furnace, are inclosed in a suitable casing. The descending tubes are thus protected from the heat in the furnace.

In the drawings, Figs. 8 and 9 are diagrams showing the water tubes attached directly to the cylindrical manifolds in several different arrangements; Fig. 8 showing the mud drum attached to the distributing drums, and Fig. 9 showing also a portion of the boiler in vertical section where hatched. Figs. 14 to 16 are detail views of an alternative construction for the headers; Fig. 14 showing a header with the distributing drum and mud drum arranged as in Fig. 7, the header and distributing drum being shown in section with a partition extending through both.

The improvements consist partly in a steam and distributing drum connected by ascending water tubes which are extended through the fire box and furnace over the hottest part of the fire, and in a shield arranged outside of such ascending tubes, and a series of descending water tubes connecting the steam drum with the distributing drum outside of such shield. Return flues are preferably formed outside of the shields, and the heated gases are admitted to such return flues through a passage in the top of the shield and conducted thence downward to the chimney outlet. The descending tubes in such case are arranged within the return flues, and thus absorb the heat from the gases; while their temperature is very much lower than that of the ascending tubes, on account of the protection afforded by the shield. By maintaining the descending tubes at such lower temperature, a downward movement of the boiler fluid is secured through such tubes, and a supplemental pipe for downward circulation may also be connected with the steam and distributing drums outside of the boiler casing, where its low temperature promotes a downward movement of the fluid. The feed water is preferably introduced at the highest part of such circulating pipe, outside of the boiler casing, and the weight of the feed water, which has a greater gravity than the water in the boiler, promotes the circulation positively and materially, by the force expended in its descent to the lower part of the boiler. Such result would not be obtained if the feed water were first passed through any portion of the boiler or furnace where the feed water would be elevated to the temperature of the boiler fluid, for which reason I introduce the water into the circulating pipe outside of the boiler casing.

Another improvement consists in the connection of scum pipes with the sides of the steam drum adjacent to the water line, and in some cases in the attachment of scum plates to the inner side of the steam drum adjacent to the mouths of such pipes to direct the scum thereto. I also provide means for continuous scumming, without the frequent necessity of blowing off; the mud being deposited from the fluid in a mud drum, and the purified water being returned to the circulation.

The improvements also include in some cases the combination of a steam and distributing drum with water tubes, the ascending water tubes being projected upward through the steam drum into the steam space above the water, by which the steam is disengaged more freely from the rising fluid, and the descending water tubes operating to return the boiler fluid to the vicinity of the fire after the steam is disengaged therefrom. The descending water tubes could not perform such function if they were maintained at the same temperature as the ascending water tubes by a common exposure to the heat of the fire box; for which reason the descending water tubes are shielded from the fire in a suitable manner.

It is well known that tubes cannot be properly connected to a receptacle, in close contact with one another, in a single row of holes; as the sides of such holes would be in contact with one another. I have devised a means of connecting the pipes to form a close wall of tubes, by bending the tubes of alternate rows into the same plane; by which means ample space is secured for making the tube connections. The tubes may be secured in the manifolds or headers, by expanding the tubes in suitable apertures, or coupling them with union joints of suitable character. The descending tubes may be constructed to serve as scum pipes.

The invention also consists in extending the ascending tubes inwardly from the manifolds or headers over the fire to directly receive the radiation of the fire, the tubes then being bent upward to enter the steam drum, and being inclined upward from the manifold or header to such bend, to insure the movement of the heated fluid from the manifold or header toward the steam drum.

The invention consists also in combining the steam drum with a suitable frame adapted to sustain the same with the water tubes and the distributing drums suspended therefrom; by which construction the free expansion of the water tubes is secured without any possibility of strain upon their joints.

These improvements furnish means for promoting the discharge of the steam generated within the ascending tubes, means for promoting the circulation of water from the steam drum to the lower ends of the water tubes, means for collecting and discharging the sediment from the boiler, and means for preventing any strain upon the joints by the expansion of the water tubes.

Figure 6:
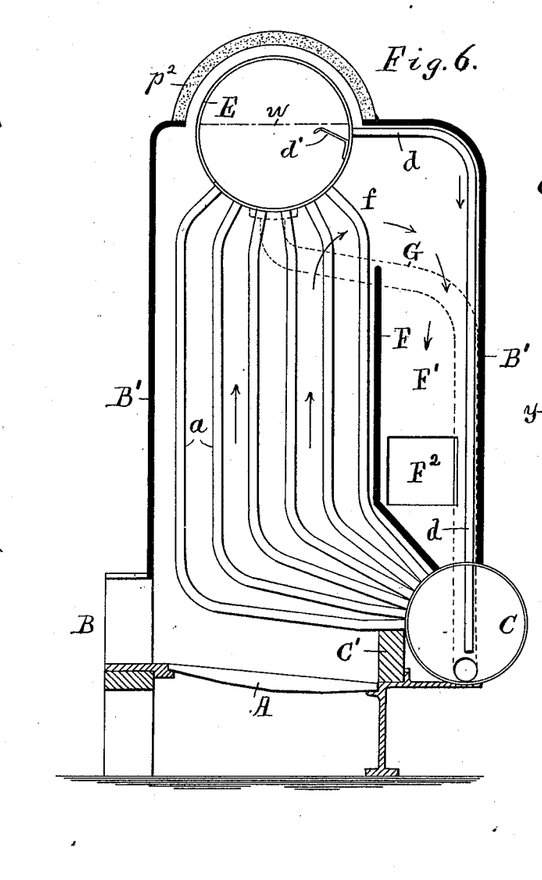
Fig. 6 is a diagram showing a boiler constructed with one cylindrical manifold only.

The simplest illustration of the invention is shown in Fig. 6; exhibiting the combination of the ascending and descending tubes with a single distributing drum. In this figure, A is the fire grate, B the fire door, and C the cylindrical manifold which operates as a distributing drum at one edge of the grate. A door would be provided to the furnace. E is a steam drum above the grate, and B' a boiler casing extending from the sides of the same downward. A partition F with opening $f$ at its upper end forms a downward return flue F' from which an outlet $F^2$ conducts the gases to the chimney. The lower half of the distributing drum is protected from the heat of the fire by a fire brick C', and immediately above the fire brick ascending water tubes $a$ are projected inward over the grate toward the opposite side of the casing B', and bent upwardly to enter the steam drum. The bottom ends of the tubes may be secured in the shell of the drum in any suitable manner, but are preferably expanded therein at right angles to its surface, the tubes from the distributing drum thus projecting radially from the shell of the drum in several rows or series, as shown in the figure. The apertures for inserting the tubes may be formed in zigzag rows so as to arrange the tubes and their interspaces alternately in the several rows, and thus effectively intercept the flames rising from the grate. The upper side of the distributing drum curves backward from the fire, and the joints of the tubes with the drum are thus protected from the impact of the flames. Descending tubes $d$ are connected with the steam drum just below the water level indicated by line $w^3$, and are extended downward through the flue $f'$ into the top of the distributing drum and thence downward nearly to the bottom of the same. A scum plate $d'$ is attached to the shell of the steam drum just below the mouths of the scum tubes, and deflected upward nearly to the surface of the water to direct the scum into such tubes. The pipes $d$ being inclosed in the return flue, are protected from the direct heat of the fire, and their lower temperature thus induces a downward circulation which operates to draw the scum from the surface of the water in the steam drum and deposits it in the bottom of the distributing drum, from which it may be discharged in any suitable manner. The fluid discharged into the drum C by the descending tubes $d$, is in close proximity to the mouths or inlets of the adjacent tubes $a$, thus supplying the rising current or upward circulation in the latter. The descending water tubes thus operate not only to replace the fluid rising in the ascending tubes $a$, but operate incidentally as scum pipes, to remove the scum from the surface of the water in the steam drum, and thus greatly promote the rising of the steam therein. The descending tubes are more limited in number than the ascending tubes, and when required I provide an additional channel for downward circulation by an auxiliary pipe G outside of the boiler casing.

Figure 3:
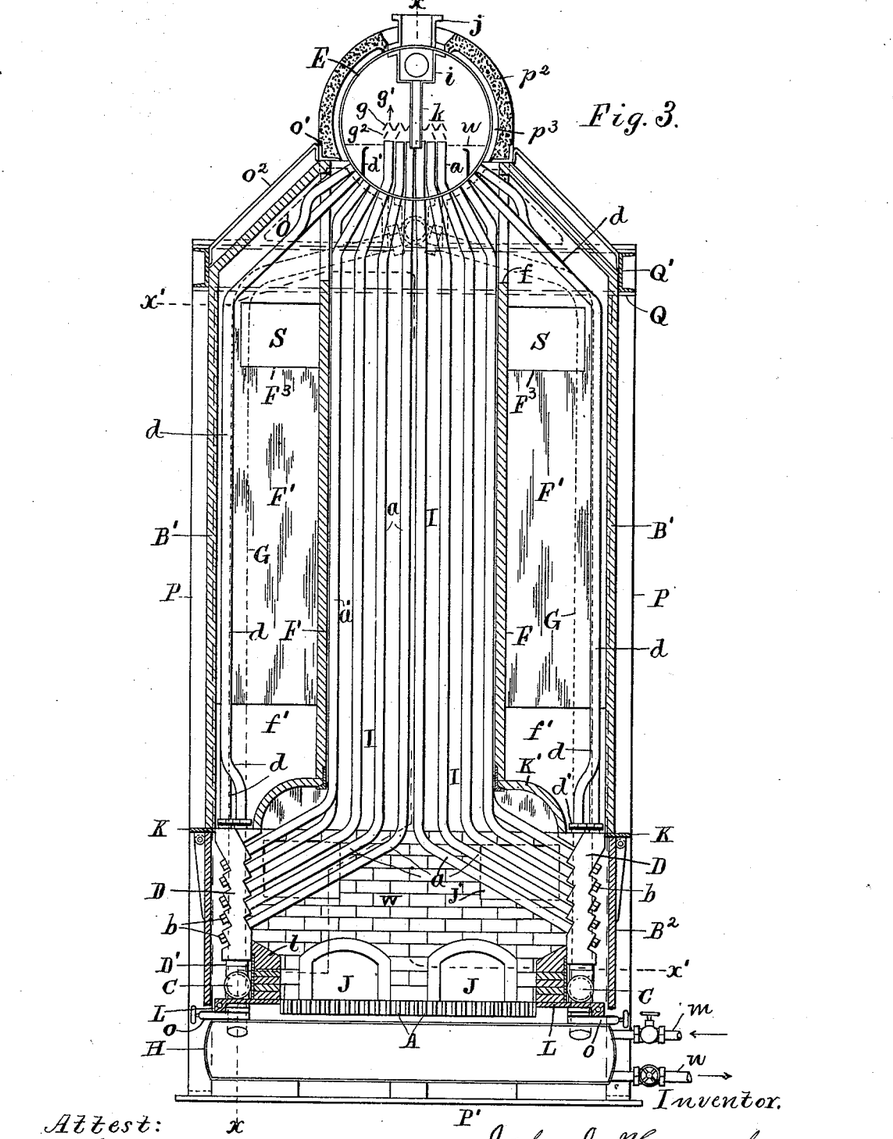
Fig. 3 is a vertical section on line $y$, $y$, in Fig. 5.
Figure 7:
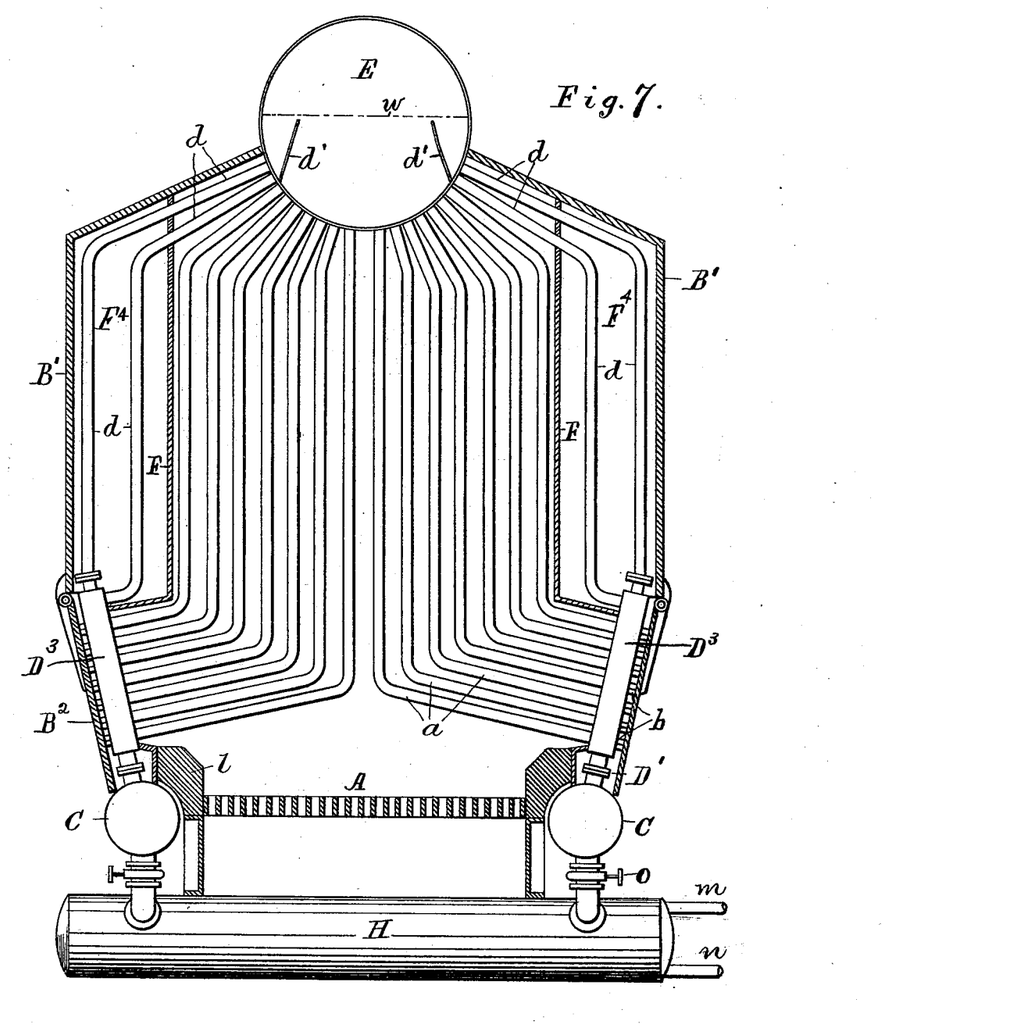
Fig. 7 is a diagram showing a special arrangement of the distributing drums and headers, with the parts in vertical section where hatched.

Another illustration is shown in Fig. 7, where two distributing drums C and two sets of vertical headers D are combined with one steam drum E, and the distributing drums are arranged at opposite sides of the fire box; thus forming a symmetrical construction. A smoke outlet T' is shown near the top of the furnace, and the descending tubes $d$ are conducted through flues F which protect them from the heat of the furnace as desired. The distributing drums C are connected with a mud drum H by cocks $o$, and the mud drum is provided with a steam pipe $m$ and a blow-off pipe $n$ which would be furnished with suitable cocks for blowing off the mud drum when desired; as shown in Fig. 3.

Figure 8:
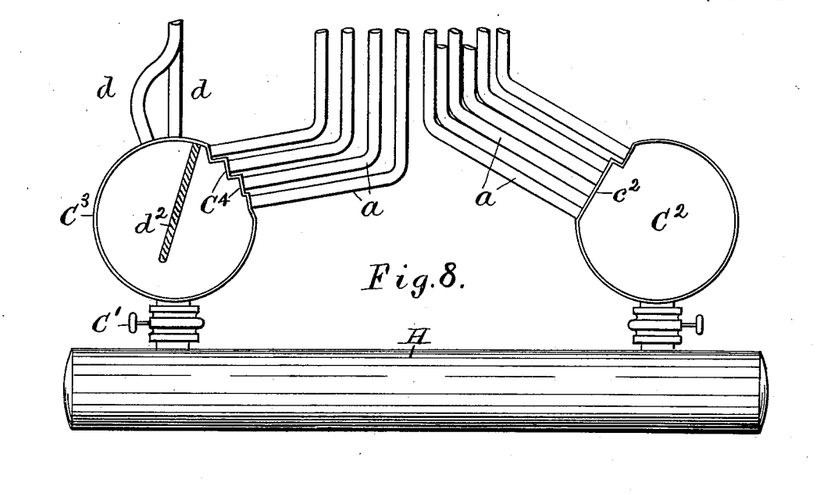
Figure 9:
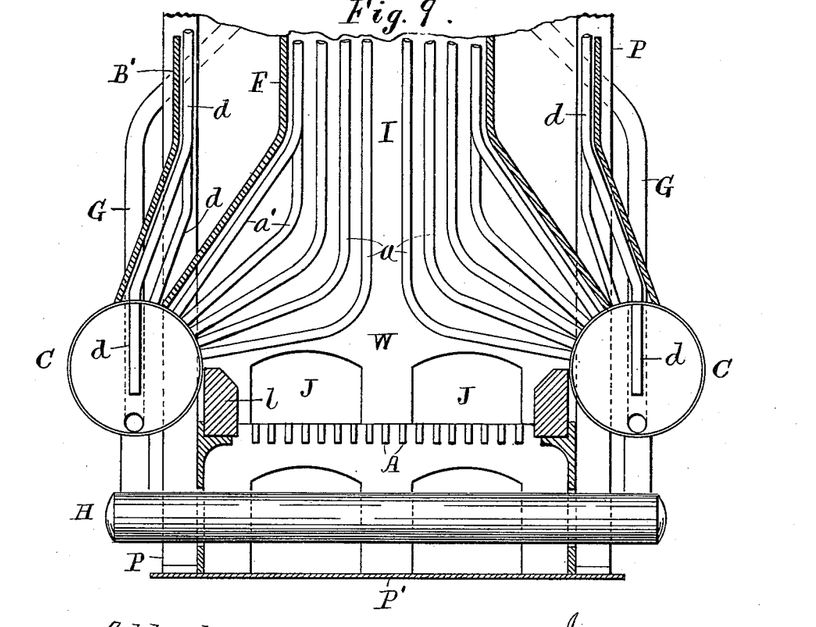

In the illustration in Figs. 8 and 9, the ascending tubes $a$ are shown inserted without the intervention of headers, directly in the distributing drums, which thus operate as manifolds to connect the lower ends of the tubes. In Fig. 8 the drum or manifold $C^2$ is shown formed with a flat plate $c^2$ on one side inclined outwardly from the fire where the tubes are inserted, so that when the tubes are inserted at right angles into the plate and extended over the fire, they may be inclined upwardly; as required to promote the movement of the steam. The drum or manifold $C^3$ in the same figure, is formed with a series of steps or seats $C^4$ like the headers D in Fig. 3, to facilitate the insertion of the pipes in the drum at the desired angle.

In the manifolds shown in Fig. 9, the tubes are inserted at right angles to the cylindrical surface and therefore radiate into the fire box at different angles.

The constructions in Figs. 6, 8 and 9, are not so practical as that shown in Fig. 7, although a very desirable outlet is furnished for the scum pipes by inserting them directly into the distributing drum. In such case, the sediment carried by such pipes may be deposited in the lower part of the distributing drum where it would readily fall into the mud drum H.

Figure 14:
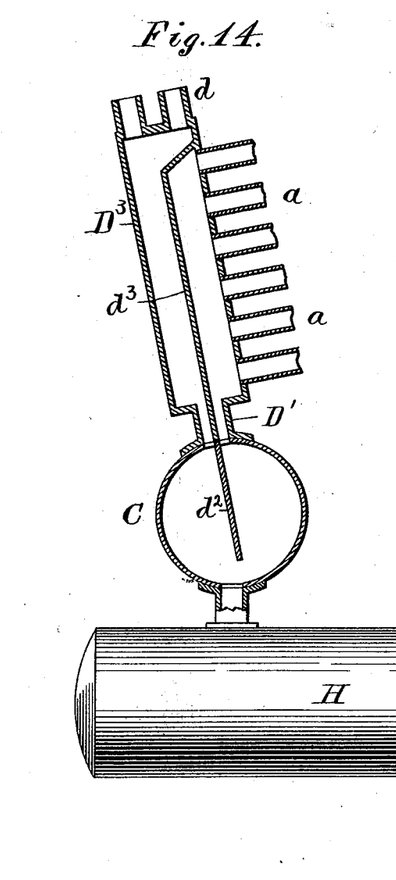
Figures 15, 16, 17:
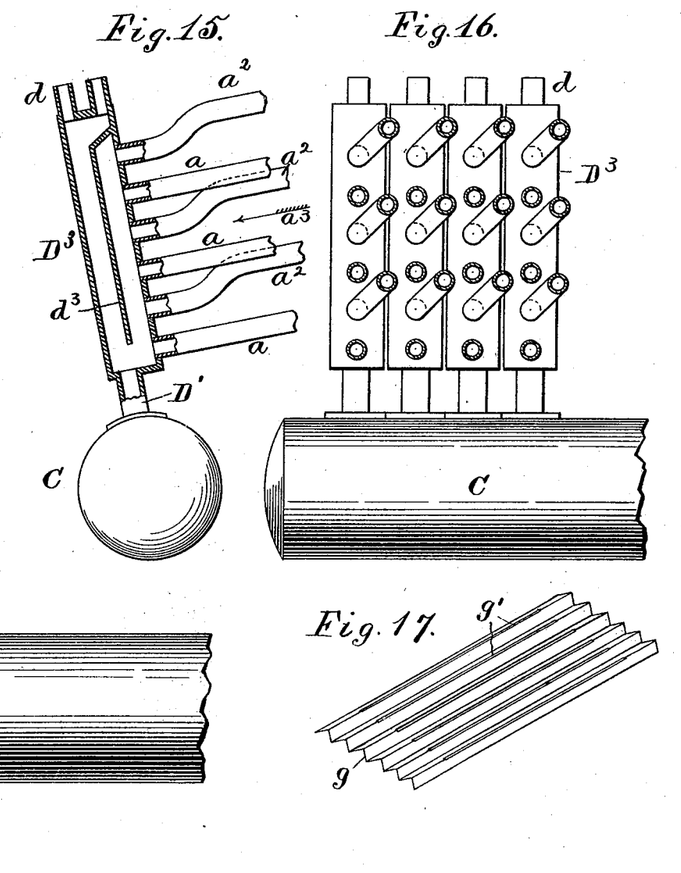
Fig. 15 is a view of the header and distributing drum with a partition inside the header only.
Fig. 16 shows the inner sides of four headers with a portion of the distributing drum attached.
Fig. 17 is a perspective view of the baffle-plate $g$.

To secure the deposition of the sediment, a partition may be extended from the top of the distributing drum downward nearly to the bottom, as shown at $d^2$ in Fig. 8, with the outlets of the tubes $a$ upon one side of the partition and the inlets of the descending tubes $d$ upon the opposite side. The partition may also be applied within the headers where the descending tubes are connected with the distributing drum by means of headers, as shown in Fig. 7. Figs. 14 and 15 show such arrangements, the partition $d'$ being confined to the header D in Fig. 15, and extending through the connection D' into contact with the partition $d^2$ inside the distributing drum, in Fig. 14. In both cases the ascending and descending tubes are connected to the header upon opposite sides of the partition, and the fluid is thus led to the bottom of the header or of the distributing drum where it deposits its sediment before entering the ascending tubes $a$.

Having thus set forth the principles of my invention, I will describe a boiler of a practical form upon a large scale.

Figure 4:
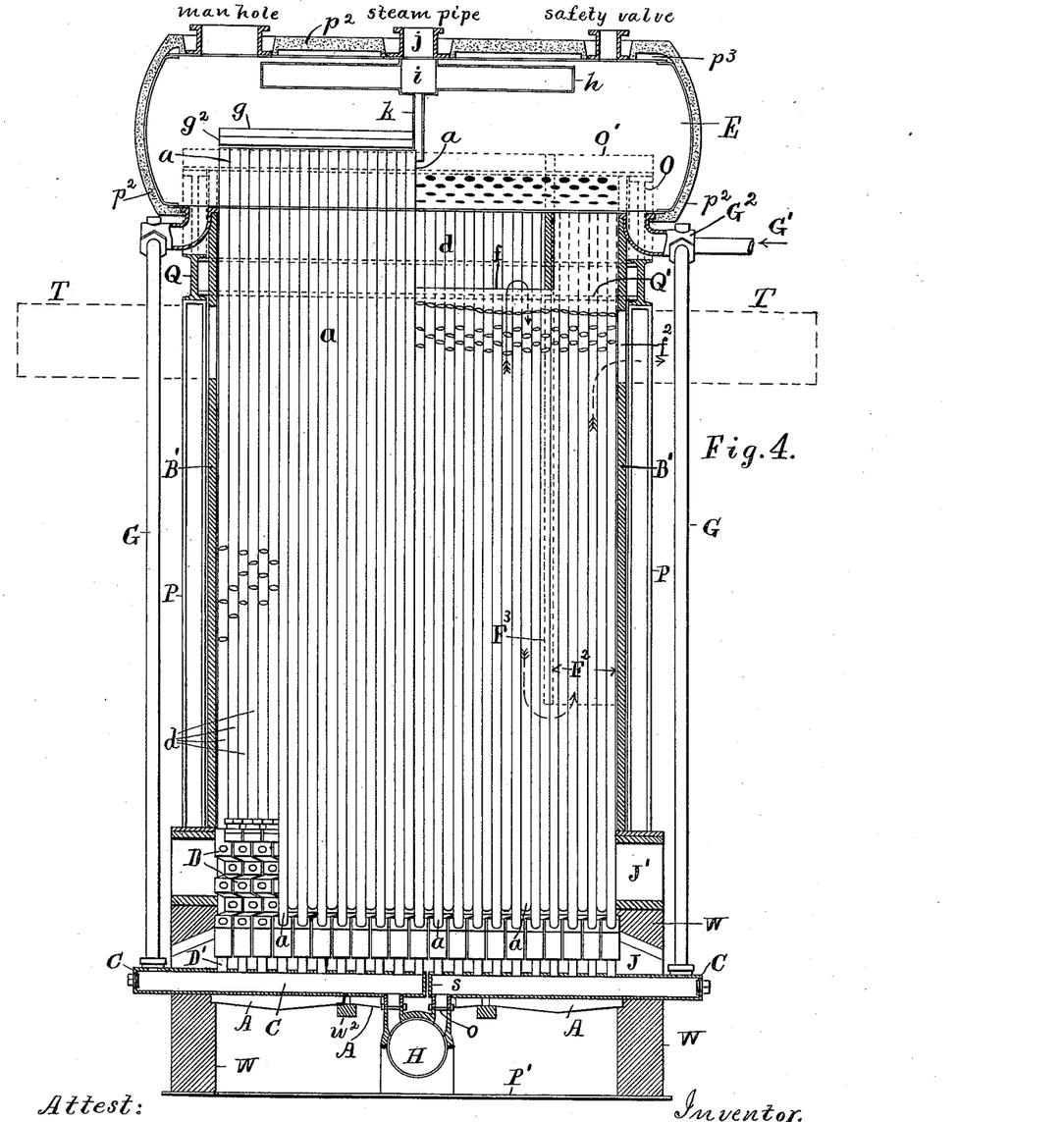
Fig. 4 is a vertical section at the upper end through the center of the steam drum, and at the lower end through one of the cleaning doors, with the fire brick in front of the distributing drum removed to show the latter in section where hatched on line $x$, $x$, in Fig. 3.
Figure 5:
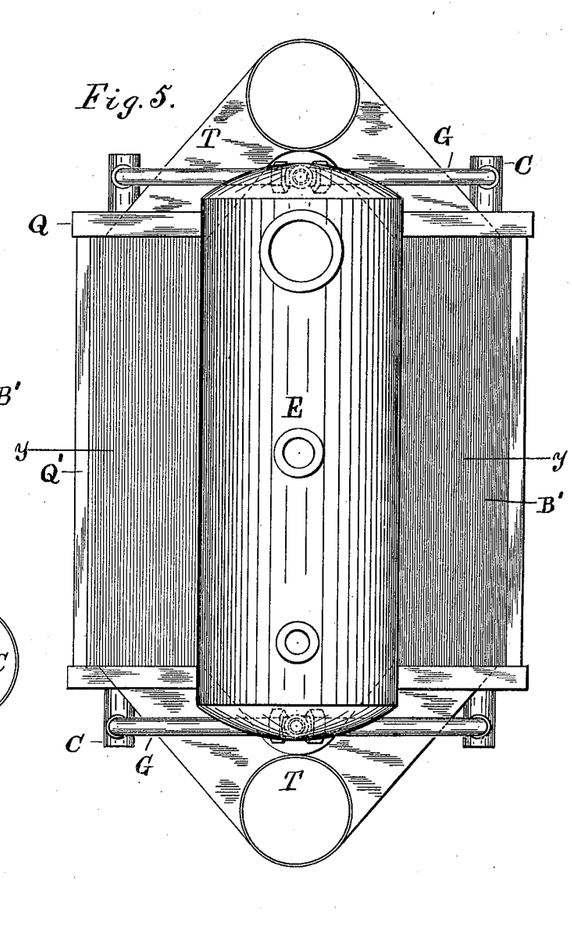
Fig. 5 is a plan of the boiler.

In Figs. 1 to 5, a distributing drum is shown at each side of the fire box, and means is shown for sustaining the drum above the furnace with the water tubes and the lower drum suspended therefrom to avoid the strains due to unequal expansion. The faces of the headers are notched in sloping steps which are inclined outward from the ascending gases, and thus protect the joints of the tubes $a$ from the impact of the flames. Four channel-bar posts P are shown erected upon a bed P' and connected at the top by horizontal beams Q and Q'. Cast iron saddles O are shown upon the beams Q to fit beneath the ends of the steam drum F, which may thus be supported with the weight of all the attached parts depending from it, the mud drum also, when used, being suspended from the distributing drums and supported with the latter, so that no resistance is opposed to the free expansion of the tubes $a$ or $d$. Bars $o'$ supported by braces $o^2$ support a non-conducting jacket $p^2$ over the steam drum, leaving a space $p$ in which the heated gases may circulate. Gage-cocks $w$ are shown connected with the steam drum by pipes $w'$ in the usual manner. The grates are supported independent of the mud drum by walls W and bearers $w^2$. The walls are formed at the ends of the furnace, the sides of which are formed by the manifolds, and the brick work of the walls is extended at the ends of the furnace as high as the tops of the manifolds upon each side. Fire doors J and cleaning doors J' are formed through such walls for access to the fire box and tubes. The casing B' at the ends of the boiler extends upward from such walls to the under side of the steam drum, and at the sides of the boiler it extends upward from the tops of the headers to the bottom of the drum casing $p'$. Plates K are extended between the walls W to support the casing, and the doors B$^2$ are hinged to such plate to expose the rear sides of the manifolds when desired. The brick work would be in practice stayed and held together, and the fronts of the walls finished with cast iron frames and doors as is common. Plates L are provided to support fire bricks $l$ at the sides of the grate, to protect the distributing drums C and the header couplings D'. Such plates are perforated for the passage of the pipes which connect the drums C and H. The headers are set back by the thickness of the fire brick $l$ from the edge of the grate A, and the joints of the pipes $a$ with the headers are thus wholly removed from the direct action of the fire. Two partitions F with flue apertures $f$ at the top are connected with the plates K by semi-arches K' to form return flues F' adjacent to the casing B', thus forming a combustion chamber I in the center of the boiler over the hottest part of the grate. The descending flues F' are shown of less width than the length of the boiler between its ends, being separated from the ascending return flues F$^2$ (which are formed next the casing B') by transverse partitions F$^3$, at the lower ends of which apertures $f'$ are formed to permit the gases to ascend. Side openings $f^2$ shown only in Fig. 4 are formed in the casing B' at the ends of the boiler to discharge the gases to a breeching T (shown in dotted lines only in Fig. 4) and direct draft openings S are formed in the upper parts of the partitions F$^3$ to permit the escape of the gases directly to the breeching through the apertures $f^2$, and dampers would be applied to such openings to close them after the fire was started. The space I within the fire box, inclosing the ascending water tubes, forms a large central combustion chamber, above the fire through which the gases pass upward to the bottom of the steam drum, thence downward through the flues F' and upward through the flues F$^2$ to the breeching. The gases are thus led upward and downward three times in contact with the water pipes, and the outside flue chambers are, by a special arrangement of the tubes, bounded upon both sides by water walls, so that the heat in the central chamber I is effectively prevented from radiating out of the boiler. Such water walls are formed by bending the tubes of alternate rows into the same plane.

Figure 10:
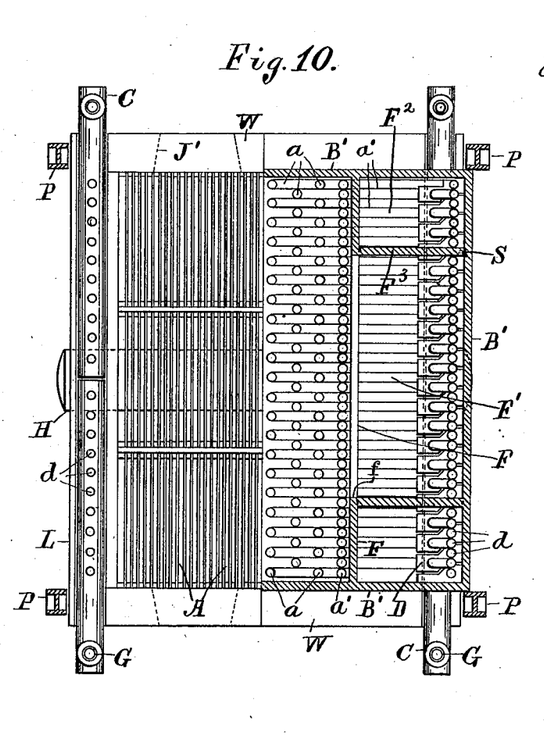
Fig. 10 is a plan showing at the left side of the center line all the parts above the distributing drum C removed, and upon the right side a section taken on line $x'$, $x'$, in Fig. 3. The line $x'$ is inserted just above the distributing drum at the right side of Fig. 3, although the corresponding parts are shown at the left side of Fig. 10 to avoid interference with the line $x$ upon the opposite side of the same view, although the corresponding parts are shown at the left side of Fig. 10.

In Fig. 3, five tubes are shown inserted in the face of each header, and the two highest tubes, lettered $a'$, are bent into the same plane to form the close wall against the partition which is shown at $a'$ in Fig. 10. This arrangement of the tubes is facilitated by the zigzag disposition of the tube openings $c$ upon the manifolds, as shown in Figs. 4 and 12, and such zigzag disposition produces alternate rows of pipes over the fire, from which they are extended upward in the body I of the furnace, as shown in Fig. 10.

Figure 13:
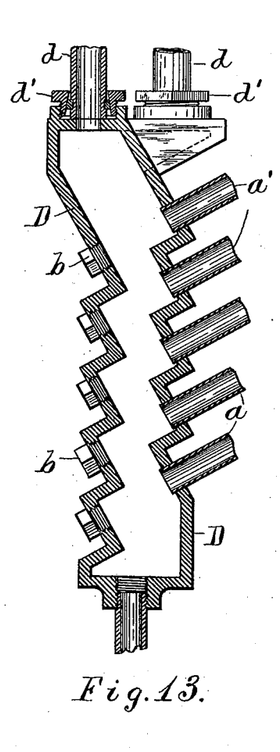
Fig. 13 is a vertical section on line $z'$, $z'$, in Fig. 12, with the connections to the distributing drum and the various water tubes.

The alternate pipes $d$, which connect the steam drum with the top of each header through the return flue F', are bent outwardly as shown in Figs. 3 and 10 to permit their lying close together in a wall of water pipes against the casing B'. The tubes $a'$ and $d$ thus form water walls to the combustion chamber I and the return flue F'. The outer casing B' may be formed of, or jacketed with non-conducting material. The tubes $d$ are in Fig. 13 shown connected with the tops of the headers by couplings D', having conical sockets fitted to conical collars slipped into grooves near the ends of the pipes. The couplings are screwed into threaded holes in the top of the manifold, and operate to press the ends of the pipes, metal to metal, against seats formed to fit the same. The pipes are thus connected with the headers by union joints and no thread is formed upon any of the water tubes at any point. By the alternate arrangement of the ascending tubes $a$ the flames which pass one row of tubes are intercepted by the next, and the heat is thus applied to the water most effectively. The tubes $a$ are shown in Figs. 3 and 4 extended into the steam drum above the water line; which in practice would be effected by making certain attachments to the tubes after they are expanded in the shell of the steam drum. The tubes thus deliver the steam and water of high temperature directly into the steam chamber without meeting any opposing currents of reduced temperature. It is obvious that the wall of vertical water tubes $a'$ operates to shield the water tubes $d$ from the direct heat of the furnace; while the wall of vertical water tubes $d$ operates to retain the heat in the return flue, if one be formed between the two walls of water tubes; and thus prevents radiation to the atmosphere, in a very great degree. I have therefore claimed the use of such walls of vertical water tubes whether the partition F be used or not. It is preferable that the hottest of the ascending water tubes should be extended into the steam drum above the water line, for which reason the tubes $a$ from the lower part of each header are extended up into the steam space above the water line $w^3$. The tubes $a'$ which are most remote from the grate, in their connection with the headers, are not so highly heated as the tubes $a$, and are therefore connected with the bottom of the steam drum only; delivering their heated currents to the water in the steam drum, the whole surface of which gives off steam, owing to the heat transmitted to it through the tubes and by the heated gases in contact with its shell.

In Fig. 13 screw caps $b$ are shown, applied to the rear sides of the headers, through which the tools are inserted for expanding the ends of the tubes into the apertures $c$. The doors $B^2$ permit access to such caps for repairing any of the joints when required. The couplings or joints uniting the headers with the drums C and the latter with the mud drum H, are exposed for inspection by the opening of the door $B^2$.

Figures 11, 12:
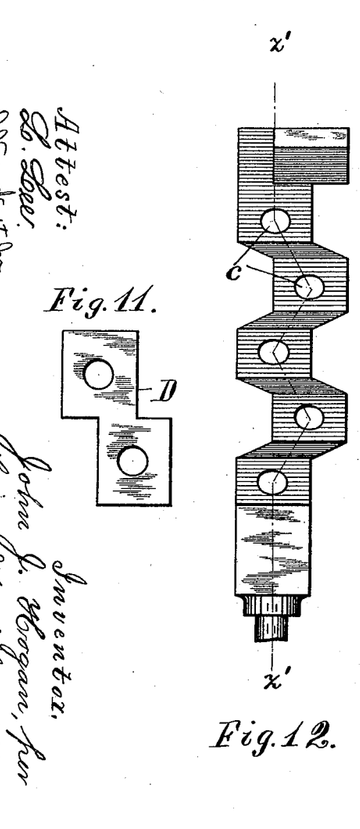
Fig. 11 is a plan of the manifold shown in Figs. 3 and 4.
Fig. 12 is a view of the inner face of the same.

The faces of the headers shown in Figs. 12 and 13, are formed with a series of backwardly inclined steps from which the tubes $a, a'$, are projected at right angles. By the backward inclination of such steps the joints of the tubes with the header are relieved in some measure from the most intense rays of heat which radiate directly from the fuel. An inclination of the face of the header is thus secured at each joint without inclining the whole header outwardly. The insertion of the tubes $a, a'$, in the inclined faces of the steps gives the tubes a corresponding inclination as they project over the fire, and greatly facilitates the rise or movement of the heated fluid therein before it reaches the vertical portion of the tube which extends upward to the steam drum. A baffle-plate $g$ is fixed within the steam drum over the mouths of the tubes to throw the water downward. The baffle-plate as shown in Fig. 17, is corrugated or bent upward to form channels terminating in fine slots $g'$ through which the steam passes, and thus escapes without passing laterally to reach the edge of the baffle-plate. Separate deflectors $g^2$ are preferably arranged beneath the channels in the baffle-plate to break the upward flow of the water as it is discharged from the tubes.

A dry pipe $h$ is extended along the upper part of the steam drum and connected with a box $i$ under the outlet nozzle $j$. A drip pipe $k$ connects the bottom of the box $i$ with the water level $e$ in the drum. The mouths of the tubes $d$ open into the steam drum adjacent to the water line, and as the current flows downwardly in such tubes they are especially adapted to draw off the impurities floating on the surface of the water, and thus facilitate the escape of steam from the water. These tubes are thus particularly adapted to serve as scum pipes, and a scum plate $d'$ is fixed to the shell of the boiler below the mouths of such pipes and extended nearly to the surface of the water, to direct the impurities into the same. The impurities when discharged from such pipes into the header settle downward through the same, in the course of time, into the distributing drum C and thence into the mud drum H.

It is obvious that the header forms a passage for the scum to reach the distributing drum and mud drum, and the mud drum may thus be said to have a connection with the steam drum, although the scum pipe is not extended directly into the mud drum.

In Fig. 4 the distributing drum is shown divided near the middle by heads or partitions $s$, and each half connected separately with the mud drum by a gate $o$, shown also in Fig. 3. With this construction for both distributing drums, the boiler is connected to the mud drum in four different divisions, any one of which may be blown out at pleasure by closing the gates from the other three sections to the mud drum, and opening the blow off pipe $n$ from the mud drum. The steam drum then obtains a surface blow off through the pipes $d$, which discharge their contents downward to the mud drum through the distributing drum, and thus clean the whole out effectually. The mud drum itself may be emptied independently of the boiler by closing all the gates $o$ and admitting steam to the drum through a separate pipe $m$. An elbow $G^2$ is connected with the bottom of the steam drum at each end and extended outside of the casing, and circulating pipes G connect the same with the opposite ends of the distributing drums C thus providing a free channel for the downward circulation of the colder fluid outside of the boiler casing. Such circulating pipes supplement the descending current in the tubes $d$, and may be proportioned to furnish an ample current of fluid to the lower ends of the ascending tubes within the fire box. By this means, the overheating of the tubes $a$ is rendered impossible, and the steam generated in the ascending tubes is delivered into the steam drum with the utmost freedom and rapidity.

Figure 1:
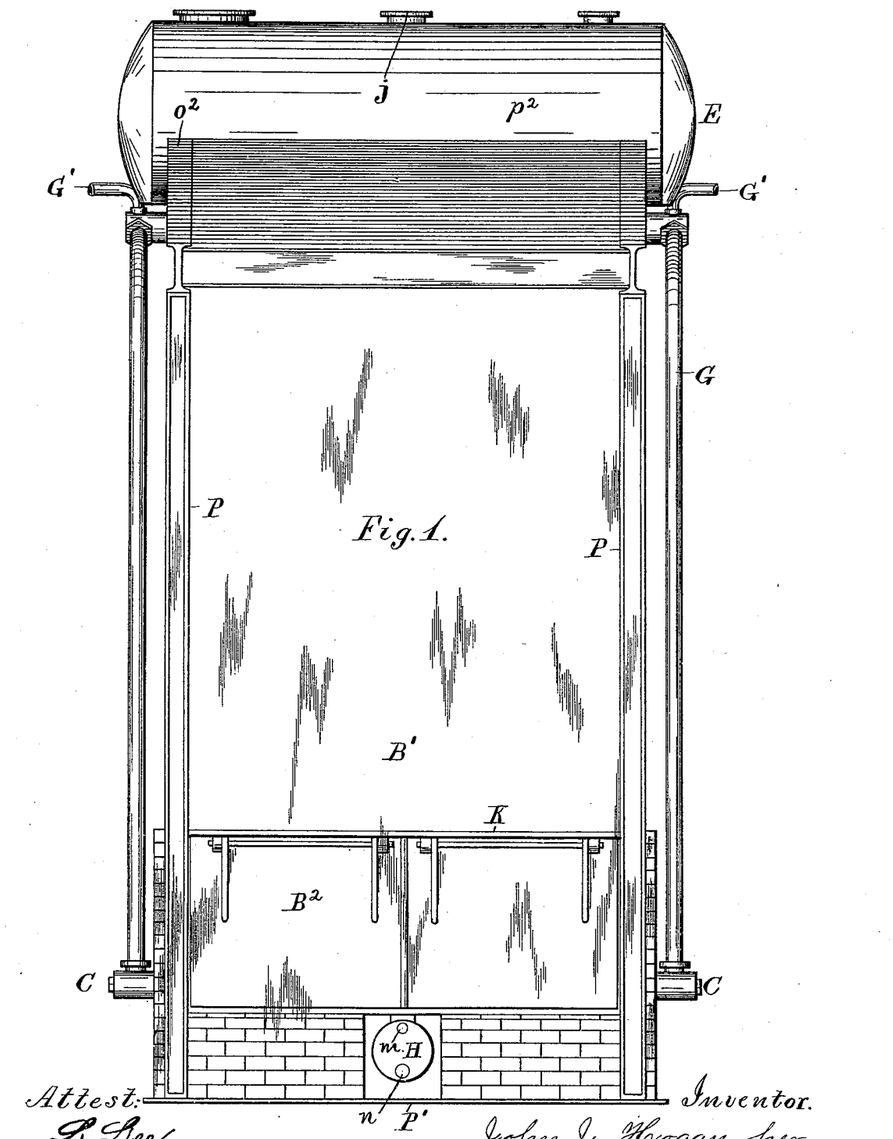
Figure 1 is a side elevation, and Fig. 2 an end elevation of a boiler illustrating my invention.
Figure 2:
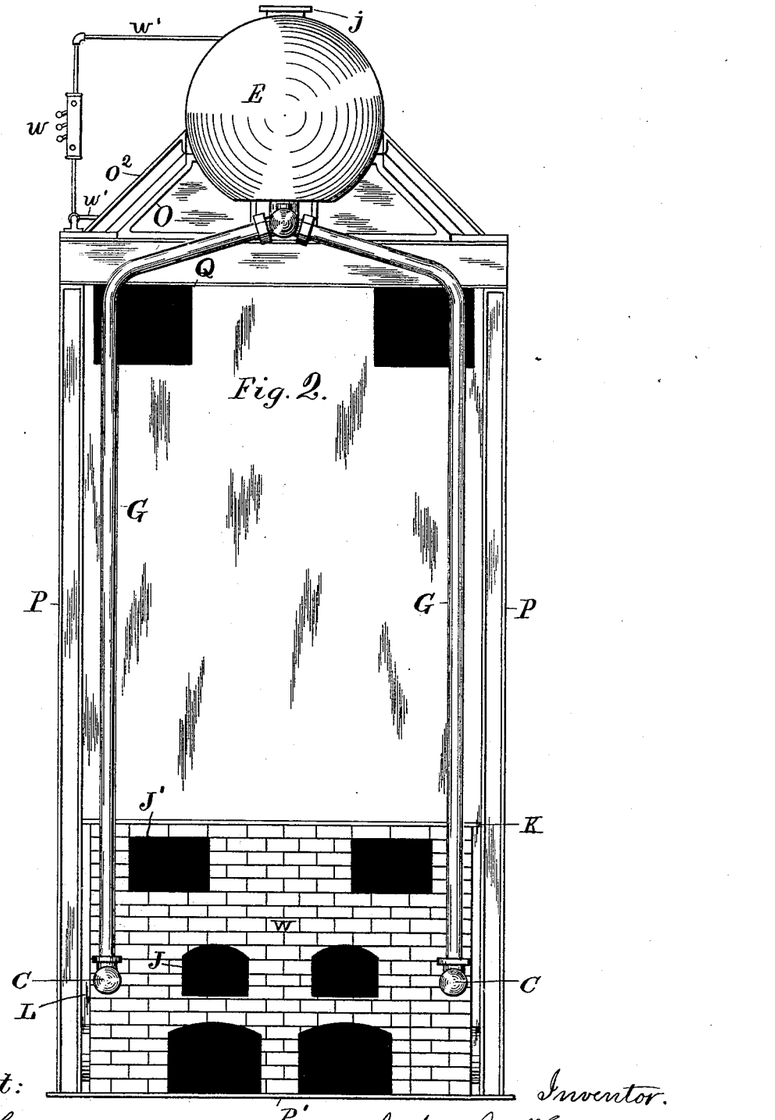

Feed pipes $G'$ are shown in Fig. 1, applied to the upper ends of the circulating pipes G close to the point where they are connected with the bottom of the steam drum E, and therefore at the highest point at which the feed water can be introduced without discharging it into the steam drum itself. The feed water when introduced in this circulating channel is mingled with the descending current of boiling water before it enters the ascending tubes, and as its volume is much smaller than that of the circulating fluid, it is highly heated before it comes in contact with any of the fire surfaces.

The descending tubes D and the circulating pipes G are connected with the lower parts of the steam and distributing drums, and are thus necessarily in communication with the colder fluid in such drums; whereas, the ascending tubes are connected with the higher parts of such drums and therefore not liable to receive any current of the colder fluid. The hot and cold columns in the boiler are thus placed in a condition where any elevation of temperature positively transfers the hotter parts of the fluid to the ascending tubes while the greater weight of the colder fluid in the descending tubes tends further to disturb the equilibrium and press the heated fluid upward. Such tendency maintains an active circulation in the boiler, but is still further aided very materially by the introduction of the feed water into the upper part of the circulating pipe G, as the weight of such water is added positively to the descending column and operates, in falling through the length of such column, to exert a corresponding force in accelerating the circulation. The introduction of the feed water into the highest available point in the boiler thus produces a positive effect in maintaining the circulation, and secures results never before attained. The circulating pipes may be covered to prevent any wasteful radiation of heat.

The constructive features may be modified without departing from my invention, of which illustration is given partly in diagrams, Figs. 6 to 9 inclusive, and partly in Figs. 12 and 16. Figs. 4 and 12 show the headers formed with zigzag passages internally to secure the zigzag arrangement of the tubes $a$, but alternate rows of pipes over the fire may also be supplied with straight headers as shown in Fig. 16, by bending the alternate tubes in each header laterally before they are bent upwardly to form the vertical ascending tubes. The elevation in Fig. 16 is taken at right angles to the face of the header in the direction indicated by the arrow $a^3$ in Fig. 15, the pipes which are bent laterally being (in Figs. 15 and 16 only) designated by the letter $a^2$. Five pipes are shown in the header illustrated in Figs. 3 and 13, but different numbers of pipes are shown in the other headers, as a boiler may be constructed with any desired number.

From the foregoing description of the boilers shown in the drawings, it will be noticed that the ascending water tubes, which are located within the fire box, constitute a hot water column, and that the descending tubes which are carried through the return flues of the boiler, form a cold column, or one relatively cooler than the hot column. Any tendency to an upward circulation in this cold column is absolutely prevented by the difference in temperatures between such tubes and the ascending water tubes, and there is therefore no opportunity for a conflict of currents in such descending tubes. They therefore furnish a continuous circulation downward to replace the fluid which is raised from the lower ends of the ascending tubes to the steam drum, and the metal in the hottest part of such ascending tubes, directly over the fire, is thus prevented from overheating. The water in the ascending tubes is also directed positively upward, in the hottest portion of such tubes, by inclining them upward as they are projected inward from the manifolds or headers, and the water in the steam drum is prevented from coming in contact with the descending currents by projecting their upper ends in great part above the water level. Each header is connected with a series of ascending tubes $a$ and with one or more return tubes $d$, and may thus be regarded as a section of the boiler, and it will be noticed that such section is provided with means for a positive circulation upward and downward, the same as the entire boiler, and the heated tubes in such section are thus prevented from burning, if exposed to a greater heat than some other section. The external circulating pipe G which furnishes another channel for the downward movement of the fluid, is also maintained at a low temperature by conducting it entirely outside of the furnace, or its smoke flues, and any tendency to an upward movement of the water therein is wholly prevented by providing a positive difference of level between the top and bottom of this cold column, and the top and bottom of the hot column. This is effected by connecting the circulating pipe with the steam drum below the level at which the ascending tubes discharge, and connecting its bottom with the distributing drum below the level at which the ascending tubes are connected. All the tubes in the boiler are thus grouped together into hot or cold columns which are not only arranged to utilize the difference of temperature in such tubes, but are connected to the steam and distributing drums at such levels as to secure positively an upward movement in the hot column, and a downward movement in the cold column. All conflict of currents within the boiler is thus prevented, and it may therefore be fired with the utmost rapidity and the capacity for steaming thereby increased with the same heating surface.

The construction shown in Figs. 1 to 5 is adapted for stationary boilers, while the forms shown in Figs. 7, 8 and 9 are adapted for locomotive or marine boilers, and the form shown in Fig. 6 is adapted for either stationary or marine boilers. The forms shown in Figs. 7 to 9 indicate modifications adapted for different conditions, and other modifications may obviously be made without departing from the essential features of the invention.

I have stated above that the distributing drum may serve as a manifold when the water tubes are inserted directly therefrom, as in Figs. 6, 8 and 9, in which case the water tubes may be said to connect directly with the distributing drum.

The lower ends of the water tubes in any case require to be connected with one another to facilitate a free circulation to any part of the boiler where a greater heat prevails, and when the water tubes are joined to headers as shown in Figs. 3 and 7, such headers require in turn to be connected together by a distributing drum, in which case the water tubes are said to make an indirect connection with the distributing drum. The distributing drum obviously performs the same function in relation to the water tubes whether used as a manifold or as the means of furnishing a general connection between the bases of the headers.

The term furnace is used herein to include the entire space between the fire and the steam drum E; but where the fire box is referred to specifically it is intended to include that part of the furnace immediately adjacent to the fire, and which, as shown in Figs. 3 and 7, may be made materially wider than the upward passage in which the ascending tubes $a$ are grouped. Such widening of the furnace at the lower end permits the extension of the ascending tubes inward from their connection with the distributing drums and thus exposes the under sides of the pipes for a considerable distance to the direct heat of the fire. The contraction of the furnace above the fire box serves to concentrate the heat upon the ascending tubes as the heated gases move toward the chimney, and thus exposes them more efficiently to the action of the fire. It is obvious that any suitable fuel, as gas or oil, may be used in place of coal, and the flame generated within the fire box as required.

It will be readily perceived that the circulating pipe or pipes G may be constructed of sufficient capacity to return all the fluid downward to the distributing drums which rises in the ascending tubes $a$.

Having thus set forth the nature of my invention, what I claim herein is—

1. In a water tube boiler, the combination, with a steam drum and distributing drum arranged substantially as set forth, of a series of ascending water tubes connecting the steam and distributing drums through the furnace, a casing inclosing the boiler, a shield independent of the tubes supported outside of such ascending tubes, and a series of descending water tubes inclosed between such shield and the casing, as set forth.

2. In a water tube boiler, the combination, with a steam drum and distributing drum arranged subtantially as set forth, of a series of ascending water tubes projected inward from the distributing drum over the fire, and thence upward through the bottom of the steam drum into the steam space above the water, a casing inclosing the boiler, a series of descending water tubes adjacent to the casing, with their upper ends inserted in the side of the steam drum, and a shield within the casing protecting such descending tubes from the heat of the furnace, as herein set forth.

3. In a water tube boiler, the combination, with a distributing drum and a grate arranged at the side of the same, of a steam drum supported above the grate, a series of ascending water tubes connected with the top of the distributing drum and projected inward over the fire, thence vertically upward through the bottom of the steam drum and within the same above the water line, a series of descending water tubes inserted in the side of the steam drum, a partition wall F dividing the descending and ascending tubes and protecting the descending tubes from the heat of the furnace, and the descending tubes having connection at their lower ends with the lower part of the distributing drum, as and for the purpose set forth.

4. In a water tube boiler, the combination, with a steam drum sustained above a furnace, and a distributing drum arranged at one side of the fire box, of a series of headers projecting upward from such distributing drum, a series of ascending water tubes projected from the face of each header inward over the fire and thence upward through the furnace into the bottom of the steam drum, a series of descending water tubes shielded from the furnace and connecting the side of the steam drum with the upper part of the header, and a partition extended downward within the header between the inlet of such descending tube and the lower ends of the ascending tubes, as herein set forth.

5. In a water tube boiler, the combination, with a steam drum and distributing drum arranged substantially as set forth, of a series of ascending water tubes projected inward over the fire and thence extended upwardly through the furnace, a shield independent of the tubes supported outside of such ascending tubes, a casing inclosing the boiler, a series of descending water tubes inclosed between such shield and the casing, and a supplemental pipe for downward circulation connecting the steam and distributing drums outside of the boiler casing, as herein set forth.

6. In a water tube boiler, the combination, with a steam drum and distributing drum arranged substantially as set forth, of a series of ascending water tubes connecting the steam and distributing drums through the furnace, a shield outside of the ascending tubes, a casing inclosing the boiler, a series of descending water tubes between such shield and the casing, and a supplemental mud drum connected with the lower part of the distributing drum, and provided with suitable cocks and pipes for blowing off the same, substantially as herein set forth.

7. In a water tube boiler, the combination, with a steam drum sustained above a furnace, of a distributing drum at one side of the furnace, a series of headers projected upward from the distributing drum, and having their faces adjacent to the furnace formed in a series of backwardly inclined steps with the tube openings formed in the steps in a zigzag line, and a series of ascending water tubes connected with such tube openings and extended inward over the fire and upward into the steam drum in alternating rows of tubes, as set forth.

8. In a water tube boiler, the combination, with a steam drum sustained above a furnace, of a distributing drum at one side of the furnace, a series of headers projected upward from the distributing drum, with tube openings upon one side and at the top, a series of ascending water tubes connected with the lateral openings and extended upward into the steam drum, a descending water tube connecting the steam drum with the top of each header, and a partition within the header dividing the opening in the top from those in its side, as and for the purpose set forth.

9. In a water tube boiler, the combination, with a steam drum and distributing drum arranged substantially as set forth, of a series of ascending water tubes connecting the steam and distributing drums through the furnace, a casing inclosing the boiler, a series of descending water tubes shielded from the furnace within the casing, a mud drum connected with the lower part of the distributing drum and a partition inserted between the lower ends of the ascending and descending tubes and extended downward within the distributing drum toward its junction with the mud drum, as and for the purpose set forth.

10. In a water tube boiler, the combination, with a steam drum and distributing drum arranged substantially as set forth, of a series of ascending water tubes connecting the steam drum and distributing drums through the furnace, a mud drum connected with the lower part of the distributing drum, a scum plate attached to the inner side of the steam drum adjacent to the water line, and a scum pipe inserted in the steam drum above the attachment of such plate and connected with the mud drum by means of the distributing drum, substantially as set forth.

11. The combination, in a boiler, of a steam drum sustained above a furnace, with a distributing drum at one or both sides of the fire box, a series of ascending water tubes connected with the distributing drum and projected laterally into the fire box and thence vertically upward through the furnace into the lower side of the steam drum, a scum plate attached to the inner side of the steam drum adjacent to the water line, and a series of scum pipes connected at their upper ends with the steam drum above the attachment of such plate, and at their lower ends discharging to the distributing drum, as and for the purpose set forth.

12. In a water tube boiler, the combination, with a steam drum sustained above a furnace, and a distributing drum arranged at one side of the fire box, of a series of headers projecting upward from such distributing drum, a series of ascending water tubes connecting each header with the lower side of the steam drum, a scum plate attached to the inner side of the steam drum adjacent to the water line and scum pipes inserted in the steam drum over the attachment of such plate, and extended to the top of the headers, as and for the purpose set forth.

13. In a water tube boiler, the combination, with a steam drum sustained above a furnace, and a distributing drum arranged at one side of the fire-box, of a series of headers projecting upward from such distributing drum, a series of ascending water tubes connecting each header with the lower side of the steam drum, a descending or return water pipe connecting the steam drum with the top of the header, and a shield arranged as set forth, to protect the tops of the headers and the descending tubes from the fire, as set forth.

14. In a water tube boiler, the combination, with a steam and distributing drum arranged at the top and bottom of a furnace as set forth, of a casing inclosing the boiler, ascending water tubes connecting the said drums through the furnace and arranged in contiguity to form a wall of water pipes upon the outer side of the furnace, a shield independent of the water tubes outside of such wall, forming a return flue within the boiler casing with an opening connecting the flue with the top of the furnace, and a series of descending water tubes arranged in contiguity to form a wall of water pipes upon the outer side of the flue inside the casing, substantially as set forth.

15. In a water tube boiler, the combination, with a fire box, of a distributing drum at each side of the same, a contracted furnace above the fire box with a steam drum above the same, a casing inclosing the boiler, partitions independent of the tubes, forming descending return flues within the casing at the sides of the furnace, two series of ascending water tubes connecting the steam and distributing drums through the fire box and furnace, and two series of descending water tubes connecting the steam and distributing drums through the return flues, as and for the purpose set forth.

16. In a water tube boiler, the combination, with a furnace and a steam drum above the same, of two distributing drums arranged at the opposite sides of the furnace, two series of water tubes connecting the steam drum with the two distributing drums, a transverse mud drum beneath the distributing drums, a partition or division in each distributing drum above the mud drum, and separate pipe connections from the mud drum to the distributing drum at each side of such division, with valves in such pipe connections, as set forth.

17. In a water tube boiler, the combination, with a steam drum arranged above a furnace, of distributing drums at opposite sides of the furnace, headers projected upward from such distributing drums, a series of water tubes connecting the face of each header with the bottom of the steam drum and extended upward within the drum above the water line, one or more descending water tubes connecting the upper end of each header with the shell of the steam drum next adjacent to the water line, and a supplemental pipe extended from each end of the steam drum at its bottom with branches connected to the ends of the distributing drums, as and for the purpose set forth.

In testimony whereof I have hereunto set my hand in the presence of two subscribing witnesses.

JOHN J. HOGAN.

Witnesses:
JOSEPH M. STOUGHTON,
THOMAS S. CRANE.